(12) United States Patent
Worthing, Jr. et al.

(10) Patent No.: US 10,831,177 B2
(45) Date of Patent: Nov. 10, 2020

(54) SYSTEMS AND METHODS FOR AUTOMATED WELDING

(71) Applicant: General Electric Company, Schenectady, NY (US)

(72) Inventors: Richard Roy Worthing, Jr., Liberty Township, OH (US); Mark Dean Pezzutti, Mason, OH (US); Lyle Timothy Rasch, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 15/631,139

(22) Filed: Jun. 23, 2017

(65) Prior Publication Data
US 2018/0373225 A1    Dec. 27, 2018

(51) Int. Cl.
| | |
|---|---|
| *G05B 19/408* | (2006.01) |
| *B23P 6/00* | (2006.01) |
| *B23K 26/03* | (2006.01) |
| *B23K 9/095* | (2006.01) |
| *B23K 9/04* | (2006.01) |

(Continued)

(52) U.S. Cl.
CPC ............ *G05B 19/4083* (2013.01); *B23K 9/04* (2013.01); *B23K 9/095* (2013.01); *B23K 9/0953* (2013.01); *B23K 9/0956* (2013.01); *B23K 9/1062* (2013.01); *B23K 9/1274* (2013.01); *B23K 26/032* (2013.01); *B23K 26/342* (2015.10); *B23P 6/007* (2013.01); *F01D 5/005* (2013.01); *B23K 2101/001* (2018.08); *F05D 2230/232* (2013.01); *F05D 2270/8041* (2013.01);

(Continued)

(58) Field of Classification Search
None
See application file for complete search history.

(56) References Cited

U.S. PATENT DOCUMENTS

| | | |
|---|---|---|
| 5,054,672 A | 10/1991 | Weissman |
| 6,912,446 B2 | 6/2005 | Wang et al. |

(Continued)

FOREIGN PATENT DOCUMENTS

| | | |
|---|---|---|
| CN | 102424971 A | 4/2012 |
| CN | 102886606 A | 1/2013 |

(Continued)

OTHER PUBLICATIONS

Gao et al., "Detection of micro gap weld using magneto-optical imaging during laser welding", Springer-Verlag London 2014 (Year: 2014).*

(Continued)

*Primary Examiner* — Carlos R Ortiz Rodriguez
(74) *Attorney, Agent, or Firm* — Dority & Manning, P.A.

(57) ABSTRACT

An automated welding system includes a mounting platform configured to receive an object, a welding tool, an imaging device configured to acquire at least one image associated with the object, and a controller. The controller is configured to receive the at least one acquired image, analyze at least one pixel in the at least one acquired image, identify, based upon the analyzing, an area to be welded in the at least one acquired image, wherein the area to be welded includes a defect, and generate, based upon the identifying, control instructions for controlling at least one of the mounting platform and the welding tool to weld the area to be welded.

14 Claims, 3 Drawing Sheets

(51) Int. Cl.
*F01D 5/00* (2006.01)
*B23K 26/342* (2014.01)
*B23K 9/10* (2006.01)
*B23K 9/127* (2006.01)
*B23K 101/00* (2006.01)

(52) U.S. Cl.
CPC .............. *G05B 2219/31308* (2013.01); *G05B 2219/45135* (2013.01)

(56) References Cited

U.S. PATENT DOCUMENTS

| | | | |
|---|---|---|---|
| 7,689,003 | B2 | 3/2010 | Shannon et al. |
| 8,110,774 | B2 | 2/2012 | Huonker et al. |
| 8,528,857 | B2 | 9/2013 | Hillereau et al. |
| 8,962,066 | B2 | 2/2015 | Burd |
| 9,038,367 | B2 | 5/2015 | Suciu et al. |
| 9,085,010 | B2 | 7/2015 | Burd |
| 9,272,369 | B2 | 3/2016 | Bruck et al. |
| 9,289,854 | B2 | 3/2016 | Bruck et al. |
| 2005/0041852 | A1 | 2/2005 | Schwarz et al. |
| 2005/0169346 | A1* | 8/2005 | Murray, Jr. .......... B23K 26/032 374/121 |
| 2013/0180107 | A1 | 7/2013 | Woods et al. |

FOREIGN PATENT DOCUMENTS

| | | |
|---|---|---|
| CN | 103753098 A | 4/2014 |
| FR | 2897550 A1 | 8/2007 |
| WO | WO2014/042970 A1 | 3/2014 |

OTHER PUBLICATIONS

European Search Report Corresponding to Application No. 18178747 dated Oct. 26, 2018.
Canadian Office Action Corresponding to Application No. 3008375 dated Apr. 9, 2019.
Machine Translated Chinese Office Action Corresponding to Application No. 201810661682 dated Feb. 3, 2020.
Canadian Office Action Corresponding to Application No. 3008375 dated Apr. 2, 2020.
Gao et al., "Detection of micro gap weld using magneto-optical imaging during laser welding", The International Journal of Advanced Technology, vol. 74, Issue No. 1-4, Jul. 2014, pp. 23-33.

* cited by examiner

SYSTEMS AND METHODS FOR AUTOMATED WELDING

BACKGROUND

The subject matter disclosed herein relates generally to an automated welding system and, more particularly, to an automated welding system that takes data of an object, such as one or more images of the object, to generate control instructions for welding the object.

At least some known welding systems are configured to use a welding tool, such as an arc welding tool, to weld an object. In some of these systems, the object is an airfoil, which is selected for repair after the airfoil has been in operation within an aircraft engine for some amount of time. During operation, the airfoil may sustain wear, which may adversely affect its performance. For example, cracks or blade tip abrasion may occur in the airfoil, which may affect the cooling circuits of the blade and/or the aerodynamic performance. A welding tool may be used to repair these cracks and to rebuild the blade tip.

Many known welding systems, particularly airfoil welding systems, are not fully automated. Such systems may produce an excess of process scrap and are frequently inefficient, because welders must be trained and re-trained on the welding equipment.

BRIEF DESCRIPTION

In one aspect, an automated welding system is provided. The automated welding system includes a mounting platform configured to receive an object, a welding tool, an imaging device configured to acquire at least one image associated with the object, and a controller. The controller is configured to receive the at least one acquired image, analyze at least one pixel in the at least one acquired image, identify, based upon the analyzing, an area to be welded in the at least one acquired image, wherein the area to be welded includes a defect, and generate, based upon the identifying, control instructions for controlling at least one of the mounting platform and the welding tool to weld the area to be welded.

In some embodiments, the controller is further configured to analyze a plurality of pixels in the at least one acquired image to identify a predefined pattern. In addition, in some embodiments, the controller is configured to analyze grayscale data associated with the plurality of pixels to identify the predefined pattern. Further, in some embodiments, the controller is configured to designate the predefined pattern as an area to be excluded from welding. Further still, in some embodiments, the controller is configured to analyze a plurality of pixels in the at least one acquired image to identify a non-predefined pattern. Moreover, in some embodiments, the controller is configured to analyze grayscale data associated with the plurality of pixels to identify the non-predefined pattern. In addition, in some embodiments, the controller is configured to designate the non-predefined pattern as the area to be welded. In some embodiments, the automated welding system includes a structure configured to receive and secure the object, wherein the structure includes at least one of a heating apparatus, an insulating material, a viewing window, and a temperature sensor. In addition, in some embodiments, the controller is configured to generate a control instruction for controlling a heating apparatus operable to control an internal temperature of the structure, wherein the control instruction may include an instruction to maintain the internal temperature of the structure at a predetermined temperature range.

In another aspect, an article of manufacture is provided. The article of manufacture includes a non-transitory, tangible, computer readable storage medium having instructions stored thereon that, in response to execution by a controller configured for providing control instructions to at least one of a mounting platform and a welding tool, cause the controller to perform operations including receiving, by the controller, at least one acquired image of an object received on the mounting platform, analyzing, by the controller, at least one pixel in the at least one acquired image, identifying, by the controller and based upon the analyzing, an area to be welded in the at least one acquired image, wherein the area to be welded includes a defect, and generating, by the controller and based upon the identifying, control instructions for controlling at least one of the mounting platform and the welding tool to weld the area to be welded.

In some embodiments, the control instructions further cause the controller to perform operations including analyzing, by the controller, a plurality of pixels in the at least one acquired image to identify a predefined pattern. In addition, in some embodiments, the control instructions further cause the controller to perform operations including analyzing, by the controller, grayscale data associated with the plurality of pixels to identify the predefined pattern. Further, in some embodiments, the control instructions further cause the controller to perform operations including designating, by the controller, the predefined pattern as an area to be excluded from welding. In addition, in some embodiments, the control instructions further cause the controller to perform operations including analyzing, by the controller, a plurality of pixels in the at least one acquired image to identify a non-predefined pattern. Further, in some embodiments, the control instructions further cause the controller to perform operations including analyzing, by the controller, grayscale data associated with the plurality of pixels to identify the non-predefined pattern. In addition, in some embodiments, the control instructions further cause the controller to perform operations including designating, by the controller, the non-predefined pattern as the area to be welded.

In yet another aspect, a method for operating a welding system is provided. The method includes receiving, by a controller configured to control the welding system, at least one acquired image of an object, analyzing, by the controller, at least one pixel in the at least one acquired image, identifying, by the controller and based upon the analyzing, an area to be welded in the at least one acquired image, wherein the area to be welded includes a defect, and generating, by the controller and based upon the identifying, control instructions for controlling at least one of a mounting platform configured to receive the object and a welding tool to weld the area to be welded.

In some embodiments, the method further includes analyzing, by the controller, a plurality of pixels in the at least one acquired image to identify a predefined pattern, and designating, by the controller, the predefined pattern as an area to be excluded from welding. Further, in some embodiments, the method includes analyzing, by the controller, a plurality of pixels in the at least one acquired image to identify a non-predefined pattern, and designating, by the controller, the non-predefined pattern as an area to be excluded from welding.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Embodiments of the present disclosure relate to an automated welding system. The system generally includes a structure, such as a welding box, a welding tool, an imaging device, a controller, and a mounting platform. In operation, an object, such as an airfoil, is secured on the mounting platform and placed within the structure. The object is rotated and/or translated on the mounting platform through one or more inspection positions. At each inspection position, the imaging device acquires data, such as one or more images for the object, and transmits the acquired data to the controller.

The controller receives the acquired data (e.g., a plurality of acquired images), and, in some embodiments, generates a panoramic image of the object based upon at least some of the acquired images. The controller analyzes a plurality of pixels in the acquired images and/or the panoramic image to identify a predefined pattern and/or a non-predefined pattern, such as, for example, based upon a comparison of the pattern formed by the plurality of pixels to a database or library of predefined patterns. If the pattern formed by the plurality of pixels matches a predefined pattern, the controller may determine that the plurality of pixels are associated with an as-built feature, which should be excluded from welding operations. If, on the other hand, the pattern formed by the plurality of pixels does not match a predefined pattern, the controller may determine that the plurality of pixels are associated with an area to be welded, such as a defect, which may, in some cases, include a crack.

Although the systems, methods, and articles of manufacture are described herein with reference to an object such as an airfoil, other objects, such as marine propeller blades, components of terrestrial vehicles, and/or any other object which may be welded as part of a repair or manufacturing process, are contemplated by and within the scope of the present disclosure.

Figure 1:
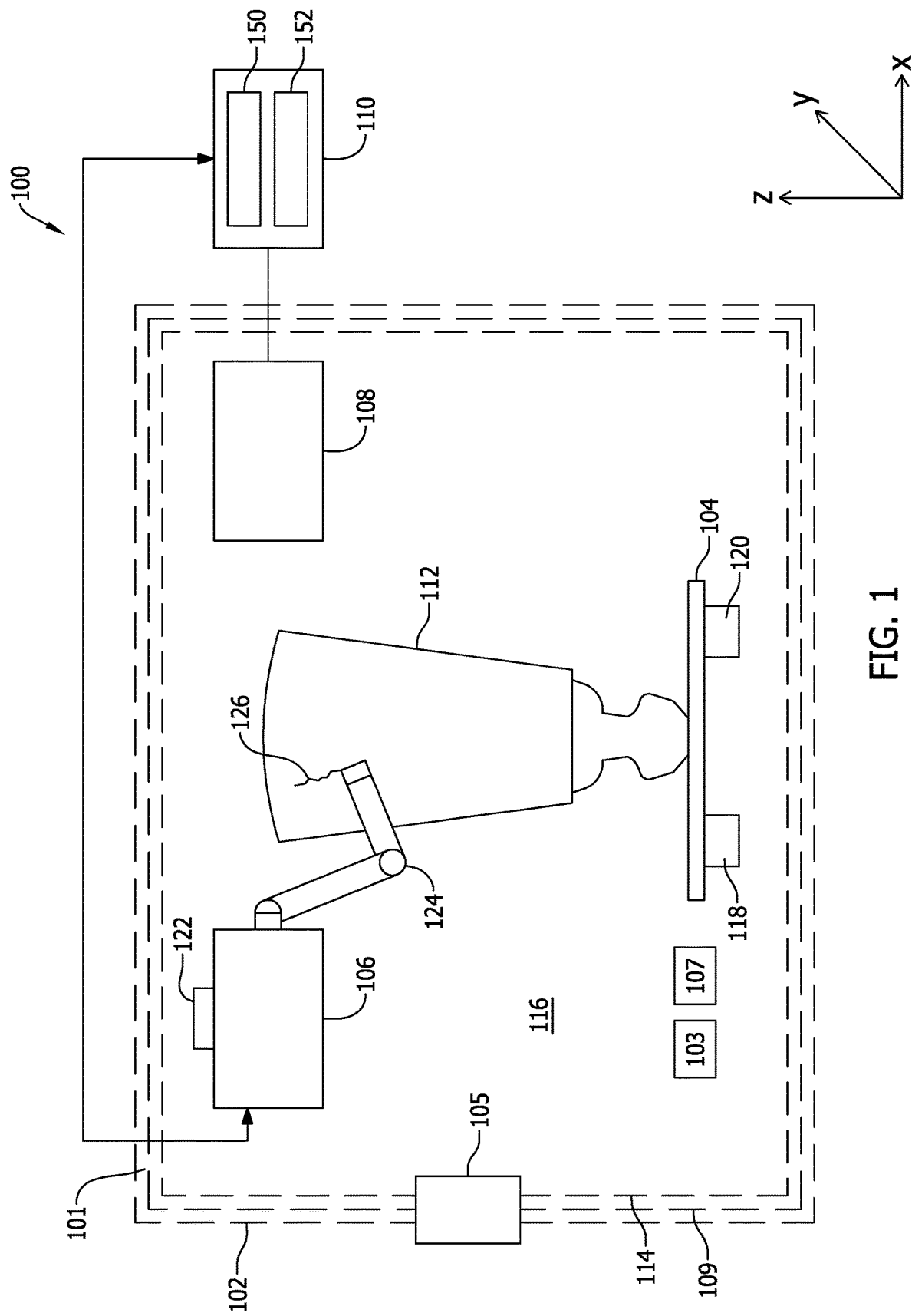
FIG. 1 is a schematic view of an exemplary automated welding system.

FIG. 1 is a schematic view of an exemplary automated welding system 100. Automated welding system 100 includes a structure 102, a mounting platform 104, a welding tool 106, an imaging device 108, and a controller 110.

Structure 102 is a container, such as a welding box, within which an object 112, such as an airfoil, is placed, and within which object 112 is welded. As shown, object 112 may include an area to be welded 126, such as a crack, and object 112 may be placed within structure 102, such that area to be welded 126 may be welded by automated welding system 100.

In the exemplary embodiment, structure 102 includes an internal surface 114 that defines a welding compartment 116. Structure 102 may be insulated by way of one or more insulating materials 101 and/or one or more shielding media 109 and may, in addition, include one or more heating apparatuses 103, such as, but not limited to, one or more electrical heating apparatuses, one or more gas burners, and the like. As described below, heating apparatuses 103 may be configured to raise an internal temperature of structure 102 (within welding compartment 116) to a desired temperature, such as a temperature at which object 112 becomes ductile, malleable, semi-molten, or otherwise workable. In addition, heating apparatuses 103 may be configured to maintain an internal temperature of structure 102 within a desired or predefined temperature range, such as a temperature range within which object 112 becomes ductile, malleable, semi-molten, or otherwise workable. Structure 102 may also include a viewing window 105 and/or one or more temperature sensors 107, which may be configured to provide feedback for control of heating apparatuses 103. Structure 102 may also be filled with an inert gas such as argon or helium. The gas may be selected to be compatible with the material of object 112.

Mounting platform 104 is a support and mounting structure configured to receive object 112. In the exemplary embodiment, object 112 is secured or mounted on mounting platform 104 for welding operations. Mounting platform 104 may include one or more clamps or fasteners for mounting and securing object 112. Mounting platform 104 may also include one or more electromechanical actuators 118 and/or one or more joints 120, which may facilitate motion of mounting platform 104. For example, mounting platform 104 may be configured to rotate about the x, y, and/or z axes. Mounting platform 104 may also be configured to translate along the x, y, and/or z axes.

Welding tool 106 is any tool capable of making a weld, such as, for example, a laser welding tool, an arc welding tool, a gas welding tool, a gas metal arc welding tool, and the like. Welding tool 106 may also include one or more electromechanical actuators 122 and/or one or more joints 124, which may facilitate motion of welding tool 106. For example, each joint 124 of welding tool 106 may be rotatable about the x, y, and/or z axes. Welding tool 106 may also be configured to translate along the x, y, and/or z axes.

Imaging device 108 is configured to acquire data associated with object 112, such as one or more images and/or other data of object 112. For example, imaging device 108 is a camera, such as a digital or CCD camera. Imaging device 108 is mounted within structure 102 and is disposed relative to mounting platform 104 at a position and angle suitable to acquire one or more images of object 112. In other embodiments, imaging device 108 is positioned outside of structure 102 in a position from which object 112 is viewable by imaging device 108. For example, imaging device 108 may, in some embodiments, be positioned outside of structure 102, such that imaging device 108 looks through viewing window 105.

Controller 110 coordinates the acquisition of data, such as one or more images, of object 112. In the exemplary embodiment, controller 110 includes one or more processors 150 communicatively coupled to one or more tangible, non-transitory, memory devices 152. In some embodiments, controller 110 further coordinates the motion of mounting platform 104 and/or the motion of welding tool 106. Controller 110 may also coordinate the operation of welding tool 106. For example, controller 110 may control a welding current and/or welding voltage supply to welding tool 106. In addition, controller 110 may control a gas selection, a gas pressure, and/or a gas flow to welding tool 106. Controller 110 may also control an angle of welding tool 106 in relation to object 112 and/or an angle of travel past object 112. Controller 110 may also control a distance of welding tool 106 to object 112 during the welding process. Controller 110 may also control the relative speed of welding tool 106 in relation to object 112 during the welding process.

Controller 110 acquires data about object 112 and identifies at least one area to be welded 126 (e.g., a defect such as a crack). After controller 110 has identified at least one area to be welded 126 in at least one acquired image, controller 110 generates one or more control instructions for controlling one or both of mounting platform 104 and/or welding tool 106. For example, the one or more control instructions may control a position and/or an orientation of mounting platform 104 and/or welding tool 106. The control instructions may be transmitted to mounting platform 104 and/or welding tool 106 for implementation.

Figure 2:
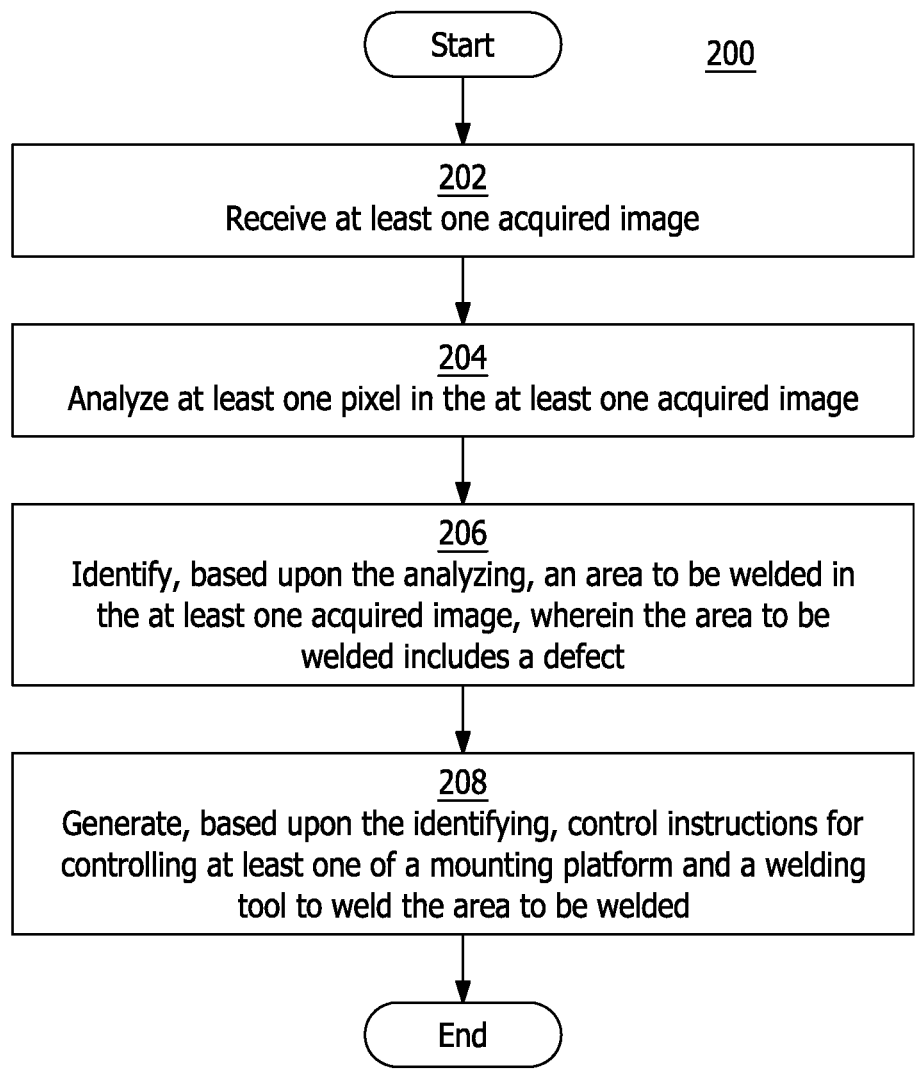
FIG. 2 is a flowchart illustrating an exemplary process for repairing an object using the automated welding system shown in FIG. 1.
Figure 3:
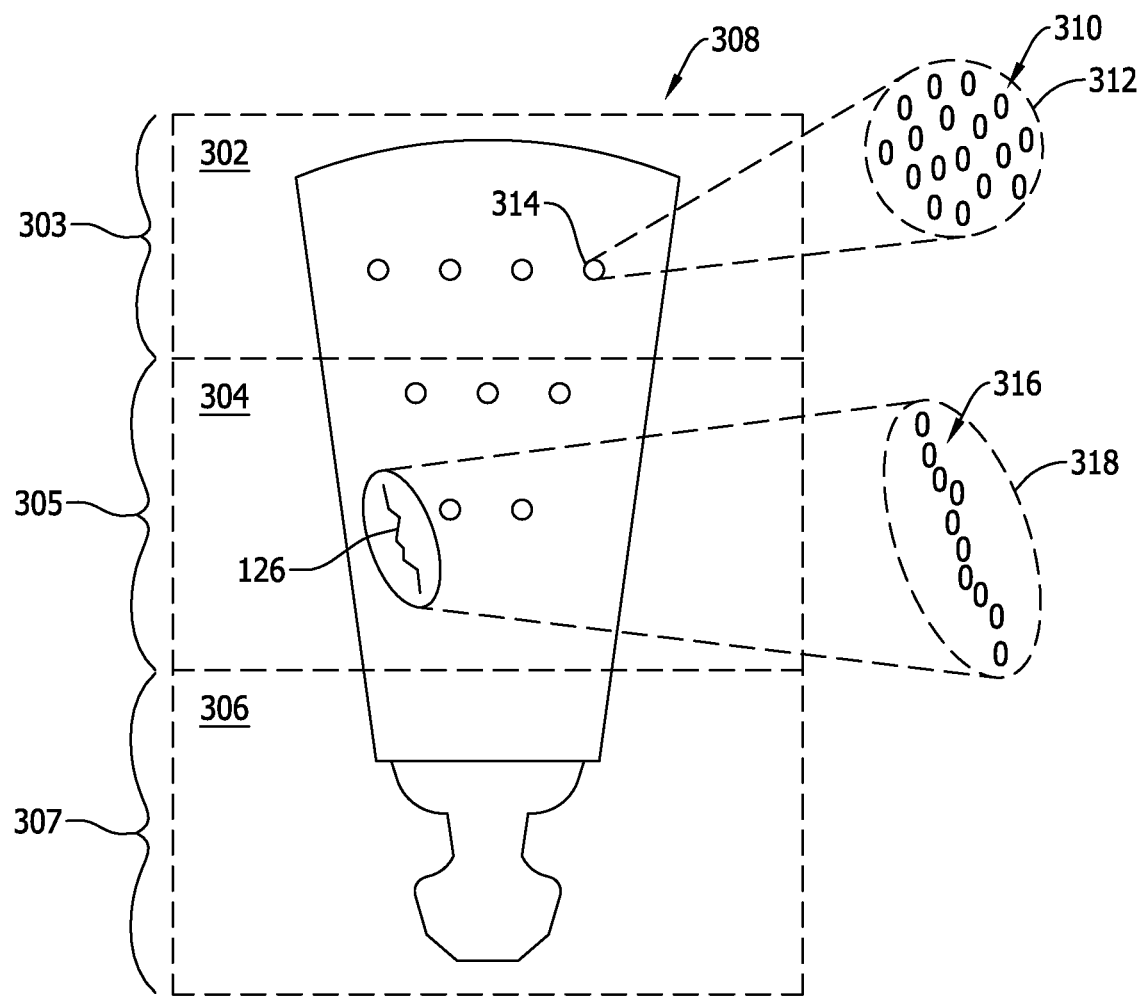
FIG. 3 is a schematic view of an exemplary series of object images compiled to form a panoramic view of the object using the automated welding system shown in FIG. 1.

FIG. 2 is a flowchart illustrating an exemplary process 200 for repairing object 112 using automated welding system 100 (shown in FIG. 1). FIG. 3 is a schematic view of an exemplary series of acquired images compiled to form a panoramic image of object 112. With combined reference to FIGS. 1, 2, and 3, initially object 112 is placed within structure 102 for repair. For example, object 112 is manually or robotically mounted on mounting platform 104 within structure 102. Further, in some embodiments, object 112 may be painted or otherwise colored, such that object 112 is of a uniform and/or desired color, such as a matte gray color.

Inside structure 102, imaging device 108 acquires data of object 112, such as one or more images of object 112. As used herein, "acquired data" may refer to one or more images of object 112 acquired by imaging device 108 of object 112 and/or any other data associated with object 112 that is acquired by imaging device 108, such as, for example, one or more infrared images of object 112. In addition, "acquired data" may include one or more images or "acquired images." For example, as described herein, imaging device 108 may scan or photograph object 112 to acquire at least one image of object 112.

Accordingly, in the exemplary embodiment, imaging device 108 acquires a plurality of images of object 112. For example, object 112 is rotated and/or translated on mounting platform 104 through one or more inspection positions. As object 112 is moved, imaging device 108 acquires a plurality of images of object 112 at each inspection position. The images may be of different portions or regions of object 112 and may be collated or collected into an image data file. For example, imaging device 108 may acquire a first image 302 of object 112 at a first region 303, a second image 304 of object 112 at a second region 305, and a third image 306 of object 112 at a third region 307. In some embodiments, object 112 may remain stationary on mounting platform 104 and imaging device 108 may be rotated, translated, or otherwise moved about object 112 to acquire first image 302, second image 304, and third image 306.

Having acquired first image 302, second image 304, and third image 306, each of first image 302, second image 304, and third image 306 are transmitted by imaging device 108 to controller 110, and controller 110 receives each of first image 302, second image 304, and third image 306 (step 202). First image 302, second image 304, and third image 306 may, in addition, be compiled, collated, or "stitched together" by controller 110 to form a panoramic image 308 of object 112.

Panoramic image 308 may include a complete view of object 112, or panoramic image 308 may include a partial view of object 112. For example, imaging device 108 may, in various embodiments, acquire a plurality of images of a single region, such as any of first region 303, second region 305, or third region 307. More particularly, in some embodiments, imaging device 108 may acquire a plurality of images of first region 303, which may correspond to a region surrounding a blade tip of object 112. In addition, in some embodiments, imaging device 108 may not acquire a plurality of images of object 112. Rather, in some embodiments, imaging device may only acquire one of first image 302, second image 304, or third image 306. In alternative embodiments, any suitable number of images of any suitable region of object 112 may be acquired.

In response to receiving the at least one acquired image, such as combined into panoramic image 308 (and/or any other acquired image or plurality of acquired images), controller 110 analyzes at least one pixel in the at least one acquired image (step 204). For example, in the exemplary embodiment, controller 110 may analyze a plurality of pixels 310 in panoramic image 308 to identify a pattern 312 formed by plurality of pixels 310. In the example shown at FIG. 3, pattern 312 is a circular pattern corresponding to an as-built feature in object 112, such as a cooling hole manufactured in object 112.

To identify pattern 312, controller 110 may, in some embodiments, analyze all of the pixels associated with panoramic image 308 (and/or any other acquired image) to identify a group of pixels associated with particular grayscale data, such as a group of pixels (e.g., pixels 310) having a particular grayscale value and/or a group of pixels having a grayscale value within a predefined range of grayscale values, such as, for example, values ranging from 0 (pure black) to 128 (middle gray), where the range of values from 0-128 may be associated with darker image colors, such as image colors that may be representative of depressions, holes, shadows, cracks, or other imperfections or surface features appearing in object 112. For instance, controller 110 may identify a cluster or group of pixels, such as pixels 310, having a grayscale value in the predefined range of grayscale values. In the example shown at FIG. 3, pixels 310 have a grayscale value of zero; however, it will be appreciated that the grayscale values of pixels 310 may range from 0-128 as described herein. Such a cluster or group of pixels may be identified or selected by controller 110 for further analysis or evaluation, such as, for example, for pattern recognition or analysis.

Specifically, and in the exemplary embodiment, controller 110 may implement pattern recognition to determine that pattern 312 formed by pixels 310 is a predefined pattern. For example, controller 110 may, in some embodiments, compare pattern 312 to a library or database of predefined patterns. If pattern 312 matches or substantially matches any of a plurality of predefined patterns stored in the library or database, controller 110 may determine that pixels 310 are associated with a predefined pattern, and, correspondingly, an as-built area. Controller 110 may, in addition, flag, mark, identify, or otherwise designate pixels 310 as being associated with an area to be excluded from welding 314, because it may not be desirable to attempt to repair an area on object 112 that includes such an as-built feature.

In like manner, controller 110 may analyze a plurality of pixels 316 in panoramic image 308 to identify a pattern 318 formed by pixels 316. In the exemplary embodiment, pattern 318 is an irregular pattern corresponding to a damaged or worn area on object 112, such as a defect or crack.

Accordingly, controller 110 is capable of discerning an as-built feature from an actual indication of a problem with object 112. Moreover, as described herein, controller 110 is able to determine a previous weld repair to object 112. Further still, in some embodiments and as described herein, controller 110 is able to distinguish a previous weld repair to object 112 from a current or existing defect or worn or damaged area of object 112.

As described above, controller 110 may compare pattern 318 formed by pixels 316 to a library or database of predefined patterns, where, as described herein, each of the predefined patterns may correspond to an as-built feature. If pattern 318 does not match, or does not substantially match, any of the predefined patterns stored in the library or database, controller 110 may determine that pixels 316 are not associated with a predefined pattern, and where pixels 316 are not associated with a predefined pattern (but rather, are associated with a non-predefined pattern), controller 110 may flag, mark, identify, or otherwise designate pixels 316 as being associated with area to welded 126 (step 206).

Having identified one or more predefined patterns of pixels in the predefined range of grayscale values and/or one or more non-predefined patterns of pixels in the predefined range of grayscale values, controller 110 may, in addition, generate one or more control instructions for controlling at least one of mounting platform 104 and/or welding tool 106 to weld area to be welded 126.

The control instructions may be transmitted to mounting platform 104 and/or welding tool 106 for implementation. For example, the control instructions may be provided to one or more actuators 118 and/or joints 120. The control instructions may be any suitable type of control instruction, such as, for example, a computer numerical control (CNC) instruction, and the like. In some embodiments, the control instructions are control signals that are provided to control mounting platform 104 and/or welding tool 106.

The control instructions may specify a welding path, which may be defined with reference to one or more x, y, and/or z coordinates. Mounting platform 104 and/or welding tool 106 may rotate and/or translate, based upon the specified welding path, such that object 112 is positioned relative to welding tool 106 in a manner that facilitates welding by welding tool 106 of area to be welded 126 on object 112. Thus, controller 110 guides mounting platform 104 and/or welding tool 106 along the welding path, such that area to be welded 126 is automatically welded by welding tool 106 along the welding path.

In some embodiments, controller 110 may, in addition, provide a control instruction or control signal to structure 102 to raise an internal temperature of structure 102 to a designated or predetermined temperature or a designated or predetermined temperature range. For example, controller 110 may provide a control signal to one or more heating apparatuses 103, based in part on signals received from one or more temperature sensors 107, that cause heating apparatuses 103 to raise the internal temperature of structure 102 to a temperature at which object 112 becomes ductile, malleable, semi-molten, or otherwise workable. Thus, the predetermined temperature may depend upon the material composition of object 112 and may vary as different objects are provided to automated welding system 100 for inspection and repair.

Embodiments of the automated welding system, as described above, facilitate an automated welding process in which an object is inspected to identify areas to be welded and repaired by way of an automated welding process. Accordingly, a controller receives acquired data, such as one or more acquired images of an object mounted on a mounting platform within a structure, and may combine the acquired images into a panoramic image of the object based upon each of the acquired images. Having received the acquired images, the controller analyzes a plurality of pixels, such as in the panoramic image, to identify a predefined pattern and/or a non-predefined pattern, such as, for example, based upon a comparison of the pattern formed by the plurality of pixels to a database or library of predefined patterns. If the pattern formed by the plurality of pixels matches a predefined pattern, the controller may determine that the plurality of pixels are associated with an as-built feature, which should be excluded from welding operations. If, on the other hand, the pattern formed by the plurality of pixels does not match a predefined pattern, the controller may determine that the plurality of pixels are associated with an area to be welded, such as a crack.

Exemplary technical effects of the automated welding system described herein include, for example: (a) inspection of an object at a plurality of inspection positions; (b) identification of as built areas for exclusion from welding operations; (c) identification of areas to be welded (e.g., cracks) for welding; and (d) heating of the object to a temperature or temperature range at which the object is workable.

Exemplary embodiments of an automated welding system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where automated welding is desired.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory includes, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with a user interface such as a mouse and a keyboard. Alternatively, other computer peripherals may also be used that may include, for example, but not be limited to, a scanner. Furthermore, in the exemplary embodiment, additional output channels may include, but not be limited to, a user interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable storage medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automated welding system comprising:
    a mounting platform configured to receive an object;
    a welding tool;
    an imaging device configured to acquire at least one image associated with the object; and
    a controller configured to:
        receive the at least one acquired image;
        analyze a plurality of pixels in the at least one acquired image;
        compare the plurality of pixels in the at least one acquired image to predefined patterns of pixels stored in a database;
        determine whether the plurality of pixels in the at least one acquired image match at least one of the predefined patterns of pixels stored in the database;
        designate areas of the plurality of pixels in the at least one acquired image that match at least one of the predefined patterns of pixels as an area to be excluded from welding and areas of the plurality of pixels that do not match at least one of the predefined patterns of pixels as an area to be welded; and
        generate control instructions for controlling at least one of said mounting platform and said welding tool to weld the area to be welded.

2. The automated welding system of claim 1, wherein said controller is further configured to analyze grayscale data associated with the plurality of pixels, wherein pixels of the plurality of pixels of the at least one acquired image that have a grayscale value within a predefined range of grayscale values are selected as the plurality of pixels to be compared to the predefined patterns of pixels stored in the database;
    determine whether the plurality of pixels in the at least one acquired image match at least one of the predefined patterns of pixels stored in the database.

3. The automated welding system of claim 1, wherein said controller is further configured to analyze grayscale data associated with the plurality of pixels, wherein groups of pixels of the plurality of pixels of the at least one acquired image that have a grayscale value within a predefined range of grayscale values are selected as the plurality of pixels to be compared to the predefined patterns of pixels stored in the database.

4. The automated welding system of claim 1, further comprising a structure configured to receive and secure the object, the structure comprising at least one of a heating apparatus, an insulating material, a viewing window, and a temperature sensor.

5. The automated welding system of claim 4, wherein said controller is further configured to generate a control instruction for controlling a heating apparatus operable to control an internal temperature of said structure.

6. The automated welding system of claim 5, wherein the control instruction for controlling the internal temperature of said structure comprises an instruction to maintain the internal temperature of said structure at a predetermined temperature range.

7. The automated welding system of claim 5, wherein said heating apparatus is a separate component from said welding tool.

8. The automated welding system of claim 1, wherein the area to be welded includes a defect.

9. An article of manufacture including a non-transitory, tangible, computer readable storage medium having instructions stored thereon that, in response to execution by a controller configured for providing control instructions to at least one of a mounting platform and a welding tool, cause said controller to perform operations comprising:
    receiving, by said controller, at least one acquired image of an object received on the mounting platform;
    analyzing, by said controller, a plurality of pixels in the at least one acquired image;

comparing, by said controller during the analyzing, the plurality of pixels in the at least one acquired image to predefined patterns of pixels stored in a database;

determining, by said controller, whether the plurality of pixels in the at least one acquired image match at least one of the predefined patterns of pixels stored in the database;

designating, by said controller, areas of the plurality of pixels in the at least one acquired image that match at least one of the predefined patterns of pixels as an area to be excluded from welding and areas of the plurality of pixels that do not match at least one of the predefined patterns of pixels as an area to be welded; and generating, by said controller, control instructions for controlling at least one of said mounting platform and said welding tool to weld the area to be welded.

10. The article of claim 9, wherein the instructions further cause said controller to perform operations comprising analyzing, by said controller, grayscale data associated with the plurality of pixels, wherein pixels of the plurality of pixels of the at least one acquired image that have a grayscale value within a predefined range of grayscale values are selected as the plurality of pixels to be compared to the predefined patterns of pixels stored in the database.

11. The article of claim 9, wherein the instructions further cause said controller to perform operations comprising analyzing, by said controller, grayscale data associated with the plurality of pixels, wherein groups of pixels of the plurality of pixels of the at least one acquired image that have a grayscale value within a predefined range of grayscale values are selected as the plurality of pixels to be compared to the predefined patterns of pixels stored in the database.

12. The article of claim 9, wherein the area to be welded includes a defect.

13. A method for operating a welding system, said method comprising:

receiving, by a controller configured to control the welding system, at least one acquired image of an object;

analyzing, by said controller, a plurality of pixels in the at least one acquired image;

comparing, by said controller during the analyzing, the plurality of pixels in the at least one acquired image to predefined patterns of pixels stored in a database;

determining, by said controller, whether the plurality of pixels in the at least one acquired image match at least one of the predefined patterns of pixels stored in the database;

designating, by said controller, areas of the plurality of pixels in the at least one acquired image that match at least one of the predefined patterns of pixels as an area to be excluded from welding and areas of the plurality of pixels that do not match at least one of the predefined patterns of pixels as an area to be welded; and generating, by said controller, control instructions for controlling at least one of a mounting platform configured to receive the object and a welding tool to weld the area to be welded.

14. The method of claim 13, wherein the area to be welded includes a defect.

* * * * *